United States Patent
Skidgel

(10) Patent No.: US 8,051,178 B2
(45) Date of Patent: Nov. 1, 2011

(54) APPARATUS AND METHOD FOR REMOTELY SHARING INFORMATION AND PROVIDING REMOTE INTERACTIVE ASSISTANCE VIA A COMMUNICATIONS NETWORK

(75) Inventor: Brandon Shane Skidgel, Jenks, OK (US)

(73) Assignee: Benefits Technologies, L.L.C., Tulsa, OK (US)

( * ) Notice: Subject to any disclaimer, the term of this patent is extended or adjusted under 35 U.S.C. 154(b) by 1596 days.

(21) Appl. No.: 10/777,913

(22) Filed: Feb. 12, 2004

(65) Prior Publication Data

US 2005/0097159 A1　　May 5, 2005

Related U.S. Application Data

(60) Provisional application No. 60/517,488, filed on Nov. 5, 2003.

(51) Int. Cl.
　　*G06F 15/16*　　(2006.01)
(52) U.S. Cl. ........ 709/227; 709/228; 709/229; 709/224; 709/203; 709/204; 709/205; 718/104; 715/736; 715/737; 715/751; 715/758
(58) Field of Classification Search ................. 709/205, 709/224, 227, 228, 203, 204, 229; 718/104; 715/710, 737, 736, 751, 758
See application file for complete search history.

(56) References Cited

U.S. PATENT DOCUMENTS

| | | | |
|---|---|---|---|
| 6,230,171 B1 * | 5/2001 | Pacifici et al. ................ 715/201 |
| 6,295,551 B1 | 9/2001 | Roberts et al. |
| 6,360,250 B1 | 3/2002 | Anupam et al. |
| 6,792,102 B2 * | 9/2004 | Shires ....................... 379/265.04 |
| 6,871,213 B1 * | 3/2005 | Graham et al. ............... 709/205 |
| 6,915,482 B2 * | 7/2005 | Jellum et al. .................. 715/234 |
| 7,149,776 B1 * | 12/2006 | Roy et al. ...................... 709/205 |
| 7,188,114 B2 * | 3/2007 | Liu et al. ....................... 707/100 |
| 7,194,553 B2 * | 3/2007 | Lucco et al. .................. 709/245 |
| 7,370,269 B1 * | 5/2008 | Prabhu et al. ................. 715/230 |
| 7,386,555 B2 * | 6/2008 | Vilcauskas et al. ............ 707/10 |
| 7,444,423 B2 * | 10/2008 | Shahi et al. ................... 709/238 |
| 7,587,368 B2 * | 9/2009 | Felsher .......................... 705/65 |
| 2002/0029245 A1 | 3/2002 | Nahon et al. |
| 2002/0032731 A1 | 3/2002 | Qian et al. |
| 2002/0035603 A1 | 3/2002 | Lee et al. |
| 2002/0049812 A1 | 4/2002 | Nahon |
| 2002/0073152 A1 | 6/2002 | Andrew et al. |
| 2002/0083134 A1 | 6/2002 | Bauer, Jr. et al. |
| 2003/0041108 A1 | 2/2003 | Henrick et al. |
| 2003/0061286 A1 | 3/2003 | Lin |
| 2003/0105819 A1 | 6/2003 | Kim et al. |

* cited by examiner

*Primary Examiner* — Pramila Parthasarathy
*Assistant Examiner* — Mohammad A Siddiqi
(74) *Attorney, Agent, or Firm* — J. Charles Dougherty

(57) ABSTRACT

A system for providing collaborative browsing of information and interactive communications on the worldwide web. A customer may use the system for a co-browsing session with a customer assistance representative by simply providing an access number from an accessed web site to the customer service representative. The customer is transparently switched from a normal web site to a co-browsing web site merely by clicking on a button to request assistance. The co-browsing site includes software to periodically poll a server for synchronization purposes.

8 Claims, 4 Drawing Sheets

APPARATUS AND METHOD FOR REMOTELY SHARING INFORMATION AND PROVIDING REMOTE INTERACTIVE ASSISTANCE VIA A COMMUNICATIONS NETWORK

BACKGROUND OF INVENTION

This application claims priority based on provisional patent application No. 60/517,488, entitled "Apparatus and Method for Remotely Sharing Information and Providing Remote Interactive Assistance Via a Communications Network," filed Nov. 5, 2003. Such application is fully incorporated by reference herein.

The present invention relates to a system and method for providing communications between users over a computer network and, more particularly, to a system and method for providing collaborative browsing (sometimes referred to as "co-browsing") of information and interactive communications on the world-wide web (WWW), such that, for example, an operator and customer may jointly browse World Wide Web content while communicating by telephone.

The sales volume of Internet businesses continues to increase, and now approaches $60 billion annually. Internet-based transactions offer many advantages for both buyer and seller. From the seller's perspective, the cost of a fixed storefront facility may be eliminated, along with the associated maintenance and manpower costs, while maintaining a store that is effectively open at all times. Using just-in-time inventory control techniques, sellers can significantly reduce the overhead associated with the sale of their products through the use of an Internet web site. Internet sales may also offer advantages in the avoidance of state excise taxes and restrictive state laws pertaining to in-state sales. Advantages to buyers include the ability to consummate transactions from any location where a computer and Internet connection is available, at any time of the day or night. The customer also benefits from the seller's reduced costs, since in order to compete with other Internet retailers the seller will likely be required to pass some of its cost reductions on to the consumer in the form of reduced prices.

One of the most significant drawbacks with Internet sales today is the limited manner in which customer interaction and support may be accomplished. A customer who has a question about a product not addressed in the materials posted to the seller's web site has few attractive alternatives. The customer may send an email to the web site operator, which then generally requires a significant wait of hours or even days in order for a reply to be received. Since the customer's web browser will in all likelihood no longer be pointed at the URL for the page where the customer's question was formulated, more time is wasted as the consumer again locates this particular web page in order to proceed with the order. Follow-up questions, which are often necessary, then require another significant wait. Confusion may result if a different customer service representative fields a follow-up question. Often the answer to the customer's question may be available somewhere on the seller's web site, had the customer only known where to look for the information. Other times there is information that can only be conveyed by an in-person customer service representative. This is particularly true with respect to customers who are not accustomed to navigation on the Internet or World Wide Web.

A common attempt to solve the problem of customer support for Internet-based sales is to supply the customer with a customer service telephone contact number. The customer who has a question about the seller's web site, or requires further information about a product, can then telephone a customer service operator and engage in a direct dialog. The customer service representative can then verbally explain the product, or answer the customer's question, in an immediate fashion similar to that of a sales person at a traditional storefront seller. The problem with this approach, however, is that the customer service representative has no means by which to directly present visual information to the customer. For example, a sales person at a storefront location faced with a question about the location of a product may simply walk the customer to the appropriate aisle and shelf where the product is displayed. If the customer has particular questions about a product's features, the salesperson can physically demonstrate the features and characteristics of the product to the customer at that time. By contrast, a customer service representative speaking by telephone to an Internet customer may direct the customer to a particular web page on the seller's Internet site, but doing so requires that the customer follow precisely the instructions of the customer service representative. These instructions may be tedious as they involve either careful directions about which links to follow or require the customer to type in a URL dictated over the phone. Verbal directions about which link to follow can often be ambiguous. A customer who mistakenly follows the wrong link may take some time to discover that a mistake was made, leading to frustration as the customer service representative's instructions do not match with what the customer is seeing on his or her computer screen. The customer service representative has no immediate means to detect this problem. The customer service representative communicating by telephone may find satisfying the customer's needs especially difficult when the customer's question pertains to use of the seller's Internet web site itself. Customers who do not regularly navigate Internet web pages may find following verbal instructions from a customer service representative just as difficult as navigation of the web site itself. Such persons may become so frustrated or intimidated by the experience that they decide to forego the transaction altogether.

This problem of guiding a customer through a web site by telephone instructions from a customer service representative is particularly challenging when the information required of the customer in order to complete a transaction is itself complex. For example, one service now provided over the Internet is employee insurance enrollment. A company may sign up to a program allowing its employees to enroll in various insurance programs offered through the company via an Internet connection. Those services are provided over the Internet in order to reduce the transaction costs associated with enrollment, and thereby help control the cost of insurance for the employees. Most employees participating in such a program will be able to enter all of the necessary information and respond to questions simply by reviewing the instructions available at the applicable web site, without requiring in-person assistance. Some employees, however, will require live assistance with the enrollment process, and call center operators are generally maintained on staff for this purpose. Given the relative complexity and quantity of information required for insurance enrollment purposes, and the various options and alternatives presented to the employee during the typical enrollment process, call center assistance may be particularly tedious. When there are various options and sub-options from which an employee may choose, it is difficult to guide the employee through the various selections when the operator is not physically viewing the same screen as the employee, and must provide directions by voice only. Errors made by the employee in entering information or navigating the site may not be immediately recognized, leading to greater confusion and frustration on the part of the employee as they are discovered later and the employee is required to backtrack or re-enter information. What is needed is a means by which the call center operator can see exactly what the employee sees on the screen; in essence, allowing the call center operator to virtually "look over the shoulder" of the employee as the information is entered. Even more desirable would be a means by which the operator could remotely enter information and navigate the web site on behalf of the employee, while allowing the employee to simultaneously view and verify all entries and choices as they are made by the operator.

A number of existing Internet services allow direct, instantaneous communication between remote users. For example, two or more users may access a designated web server providing a "text chat" service or a "voice over Internet Protocol" (VoIP) service to communicate with each other in near real time using text messages or relayed voice messages, respectively.

The existing art also includes a number of attempts to develop collaborative web browsing or "co-browsing" technology, which allows two or more users at locations remote from one another to jointly view information available on the World Wide Web. Such technology offers the promise of allowing something of the "over the shoulder" functionality desired for many applications, such as insurance enrollment customer support. Typically these co-browsing systems involve a direct, continuous link between the computers used for the co-browsing session, or at least a direct link between those computers and a third computer functioning as a server. Such systems further require specialized software to be installed at each computer in order to make the co-browsing features accessible.

An example of one such co-browsing system is disclosed in U.S. Pat. No. 6,295,551 to Robert et al. This patent describes a call center system that allows a representative and a user to jointly browse World Wide Web content while simultaneously conducting a voice conversation. A co-browsing server forms a bi-directional connection with both the operator's computer and the user's computer, thereby allowing communication between the two with the server as the communications conduit. The server also downloads software in the form of a small executable application or "applet" to the user's computer, which enables the necessary co-browsing features. This type of software is sometimes referred to as a "surrogate" in certain commercial co-browsing products. Either the user or operator can manipulate their shared view, such as by clicking on a hypertext link; this change is communicated to the server, which then communicates the change to the other computer so that the shared view is updated.

U.S. Patent Application Publication No. US 2002/0029245 to Nahon et al. teaches a co-browsing system that utilizes a proxy server between the customer and agent clients and the Internet. The customer using this system initiates a co-browsing session by selecting a link on a web page, which then redirects the customer from the regular web server connection to a connection with the proxy server. The proxy server may add a footer to a requested web page prior to distribution, and this footer may contain information to redirect the client from the real URL for the web page to the URL of the web page maintained by the proxy server. The process for using this system begins with the customer accessing the web site, then clicking on a button for assistance. The button redirects information to the proxy server, which then in turn requests information from the web server, and appends a unique identifier before storing the web page back at the proxy server. Co-browsing is facilitated by a data collaboration server, and specialized co-browsing software for intercommunication is required at each participating computer.

U.S. Patent Application Publication No. 2002/0035603 to Lee et al. teaches a co-browsing system that utilizes cached web pages and a URL transformation process. The transformed URL allows the browser of each participant to be re-directed to a collaborative version of the applicable web page administered by a collaborative browsing server. The web page with transformed URL is sent to others participating in the same co-browsing session. This functionality requires the download of an applet in order to enable co-browsing; the applet performs the URL transformation process and also contains functionality for distributing various messages generated by the users during the co-browsing session.

Based on technology similar to that taught in the references cited above, a typical procedure for utilizing a co-browsing session to help a customer navigate a web site might proceed as follows. The first step would be for the customer to indicate that live assistance is required, typically by clicking on an appropriate button appearing on a web page found at the web site of interest. A new web page would be displayed, which would include a telephone number by which the customer could contact a customer service representative at the vendor's call center. Next the customer would in fact place a call to the customer service representative, and indicate the need for live assistance. The customer service representative would then launch the co-browsing software maintained on the customer service representative's computer. This software would automatically assign a unique number to this co-browsing session for purposes of identification. The customer service representative would then verbally direct the customer to enter this session number at the web page to which the customer was redirected upon clicking the button seeking live assistance; the web page would have a text entry section designated for this purpose. The customer would then click on a button on that page designated "start interactive assistance" or the like in order to proceed. An applet containing the co-browsing software functionality would be automatically downloaded from a vendor server to the customer. This applet, ideally installed as a "plug-in" application with the customer's web browser software, would then establish communication with the customer service representative's web browser or proxy using the shared session number. Once the link is thus established, any change to one browser window will be echoed in the other user's browser window due to a communication message sent between the customer service representative's computer and customer's computer. The customer service representative and customer thus may jointly share a browsing experience. Typically the co-browsing software and applet would include additional features tailored to the co-browsing experience, such as individual cursors for each user that allow them to point to separate items on a particular page while engaging in voice communications by telephone.

This type of co-browsing method suffers from several important disadvantages and limitations. One of the most important limitations is that an open connection must be maintained between the operator's computer and customer's computer during the co-browsing section. Maintenance of such a connection may be difficult or even impossible due to the security features present on many modern firewalls and proxy servers associated with the user's computer or computer network. Intended to protect users and computer networks from external attack by viruses, worms, or hackers, these systems will often block attempts to initiate the sort of open connection required for this type of co-browsing because of the security risk such open connections entail. In order to overcome these problems, the applet downloaded to a user may need to be customized for each particular type of firewall hardware and software configuration. Given the myriad possibilities for firewall configurations, the required applet must be enormously complex or must be customized by a skilled programmer for each user who will participate in a co-browsing session. In extreme cases, it may even be necessary to set up special servers at the user's location in order to navigate through extremely tight security protocols maintained by firewalls at the user's location. Such custom configuration work is not practical in an environment where the user is any potential customer located anywhere in the world. The alternative would be to disable the user's firewall or other protection schemes, which would leave the user open to outside attack while the co-browsing session proceeds. Given the enormous potential for lost data and productivity resulting from a successful network attack, few companies would risk disabling or weakening their firewalls in order to allow a co-browsing session to proceed.

A related limitation of such systems, also stemming from the requirement for a constantly open connection, is the inherent unreliability of Internet connections made across non-dedicated telephone and cable wires. Where a constant open connection is required, a single interruption may cause the loss of data, errors in data transmission, or the failure of the synchronization aspects of the co-browsing experience. In such situations, the operator may be required to initiate a completely new session, issue a new session number to the user, and the user will then be required to start the co-browsing session again from scratch. This may mean that the user must re-enter significant amounts of data or renegotiate numerous choices on the applicable web pages. Such interruptions are costly to the vendor and frustrating to the customer who is required to start over in the process that may well have been significantly completed. Although leased land line connections are available that provide a direct, dedicated connection to reduce the likelihood of these problems, few companies could afford to maintain such a connection for the purpose of enabling a co-browsing session; thus requiring the use of a dedicated connection line would make co-browsing impractical for the vast majority of applications to which it may be applied.

Another disadvantage of these co-browsing techniques is that the steps necessary to initiate a co-browsing session are relatively complex, and require numerous active steps on the part of the customer in order for the co-browsing session to begin. The very customers who require assistance are often those persons with the least experience navigating the World Wide Web, and concomitantly those persons who are least likely to be able to successfully complete a complex initiation procedure. Those persons who are initially confused by basic elements of on-line transactions, such as standard browser commands and navigation by hyperlinks, will likely be unable to complete their portion of the co-browsing initiation procedure in order to receive the assistance they need.

Yet another disadvantage of these co-browsing techniques is that the applets or other form of software that must be downloaded or otherwise installed at the user's computer to provide the necessary co-browsing functionality may not be compatible with all web sites. Many web pages already include their own java applets, for example, which may or may not be compatible with the code associated with the co-browsing features. Thus this type of co-browsing technology is not usable with all web sites. Further, these applets or surrogates may be quite large, in some cases exceeding 600 kilobytes, which means that they may take a significant period of time to download onto a computer that is accessing the Internet over a standard dial-up modem connection. This delay may discourage persons from using the co-browsing feature, or may cause them to forego a transaction altogether. Additionally, large organizations routinely set security permissions for personal computers within their networks to prevent users from downloading files that could potentially be dangerous to the user's computer or the organization's network; such security permissions may well block any attempt to download the sort of applet or surrogate required for these co-browsing packages.

One possible solution to the problems associated with maintaining a continuously open connection is the use of polling. Instead of keeping an open connection, the subject web page as it appears on the user's screen would include code to periodically poll the web server responsible for generating each instance of that page to determine if any updates are necessary. Polling could thus in theory eliminate the need for a constantly open connection. Polling is not a practical solution using the pre-existing technologies, however, because it would severely restrict the number of persons who could simultaneously view a given web page; in other words, the solution would not be scalable. As numerous persons accessed the web page, each instance of the web page at each user's computer would be bombarding the web server looking for updates. This would create an immense load upon the web server and degrade system performance. In extreme cases, the result would be similar in effect to a "denial of service" type hacker attack, making access to the web server impossible and rendering the web site inaccessible.

Thus it would be desirable to find a scalable co-browsing system and method that is easily initiated by a customer, does not require an open connection between the participants in the co-browsing session, and does not require the download of specialized software to the customers using such a system. Such a system and method are achieved, and the limitations of the references described above are overcome, by the present invention as described below.

SUMMARY OF THE INVENTION

The present invention is directed to a system and method to facilitate co-browsing that utilizes two or more separate but related web sites in conjunction with polling techniques to provide a simple, scalable co-browsing solution. This is accomplished by the creation of a web service designed to relay web browser change events between two or more web browsers operating in a vendor and customer relationship. The information sharing process makes use of event handlers loaded in each web page. The event handler on the transmitting web page (vendor) collects browser change events and passes those events and values to the web service. Likewise, the customer web page polls the web service and updates itself based on the events relayed to the customer web page from the vendor web page via the web service. Because both the vendor and the customer page are exchanging information via the web service using normal Internet ports and not directly with each other, this information sharing technique can operate through any firewall or proxy that is capable of providing normal Internet access to system users.

According to the present invention, a customer accessing a vendor's web site and desiring live assistance may simply click on a button or link labeled "request help" or the like. The customer is then presented with a web page that provides a telephone contact number for a customer service representative and an "access" number for co-browsing. When the customer calls the given telephone number, the customer service representative requests the access number listed on the customer's web page. The customer service representative enters this access number into the software running on his or her computer, and the co-browsing session is automatically established. The customer is not required to enter any information at the web page in order to initiate the co-browsing session. Furthermore, the customer is not required to download any proprietary software; the entire co-browsing session may be navigated by the customer through the use of a standard Internet browser.

The ease of use of the present invention from the customer point of view is made possible by the employment of two separate vendor web sites in conjunction with polling functionality. One web site of the present invention is the vendor's "standard" web site, to which customers are initially sent in order to engage in Internet-based transactions with the vendor. Once the customer clicks on the button requesting assistance, however, the customer is transferred to a URL associated with the vendor's separate co-browsing web site. This transferal is transparent to the user since the web sites are generally identical in appearance. Each web page on the standard web site has an analog on the co-browsing site, but this site is not advertised, hyperlinked from public sites, or otherwise made available for general use. The difference between each page of the co-browsing web site and the corresponding page on the standard site is that the co-browsing web pages include proprietary code (such as java scripts) that periodically poll the co-browsing web server for updates. In this manner, polling may be used to update the web site for synchronization of co-browsing sessions, thus avoiding the necessity of a continuously open connection. But the invention is highly scalable because relatively few of the customers on-line at any particular time will be participating in a co-browsing session. Because only the co-browsing web server, using its separate co-browser web pages, is receiving the polling requests, there is no concern about every instance of the web page for a particular web site creating a massive burden of polling requests upon the web server. As soon as a customer ends his or her co-browsing session, the polling stops and the customer may proceed as usual once returned to the standard web site. This aspect of the present invention limits polling on the system and makes the system scalable to reasonable size without the necessity of massive web server capabilities to handle the influx of polling requests.

The co-browsing web server maintains an accurate view of the co-browsed web page at all times through updates from co-browsing software resident on the customer service representative's computer. Polling requests from the operator's co-browsing software and the java-enabled web page instance being viewed by the customer trigger response updates from the web server if the co-browsed web page has changed since the last polling request. In this manner the shared web page is constantly updated for the customer. By using polling, however, an interruption in the connection cannot cause the entire session to fail; the interruption simply prevents update to one of the user's view of the co-browsed web page for a short period of time. Likewise, since polling requests and update responses are not typically the sort of communications that would trigger security features of even the most aggressive firewalls and proxy servers, the system will work with virtually any computer or computer network without the requirement of customized hardware or software and without the requirement of disabling network defense mechanisms.

Although described above in terms of a vendor and a customer, the invention may be applied to a number of different applications where two or more persons wish to co-browse information available on the World Wide Web. Furthermore, while the invention has been described in terms of a vendor and a single customer, the invention may also be applied for use by a vendor that is co-browsing with multiple customers simultaneously.

An object of the present invention is therefore to provide a co-browsing system and method that does not require an open connection between a user's computer and a web server, proxy server, operator computer, or other network component.

A further object of the present invention is to provide a co-browsing system and method that does not require the download of specialized software in order to enable co-browsing at a user's computer.

A further object of the present invention is to provide a co-browsing system and method whereby a user may easily initiate a co-browsing session.

A further object of the present invention is to provide a co-browsing system and method that is highly scalable.

A further object of the present invention is to provide a co-browsing system and method that is fault tolerant with respect to communication interruptions.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENTS

Figure 1:
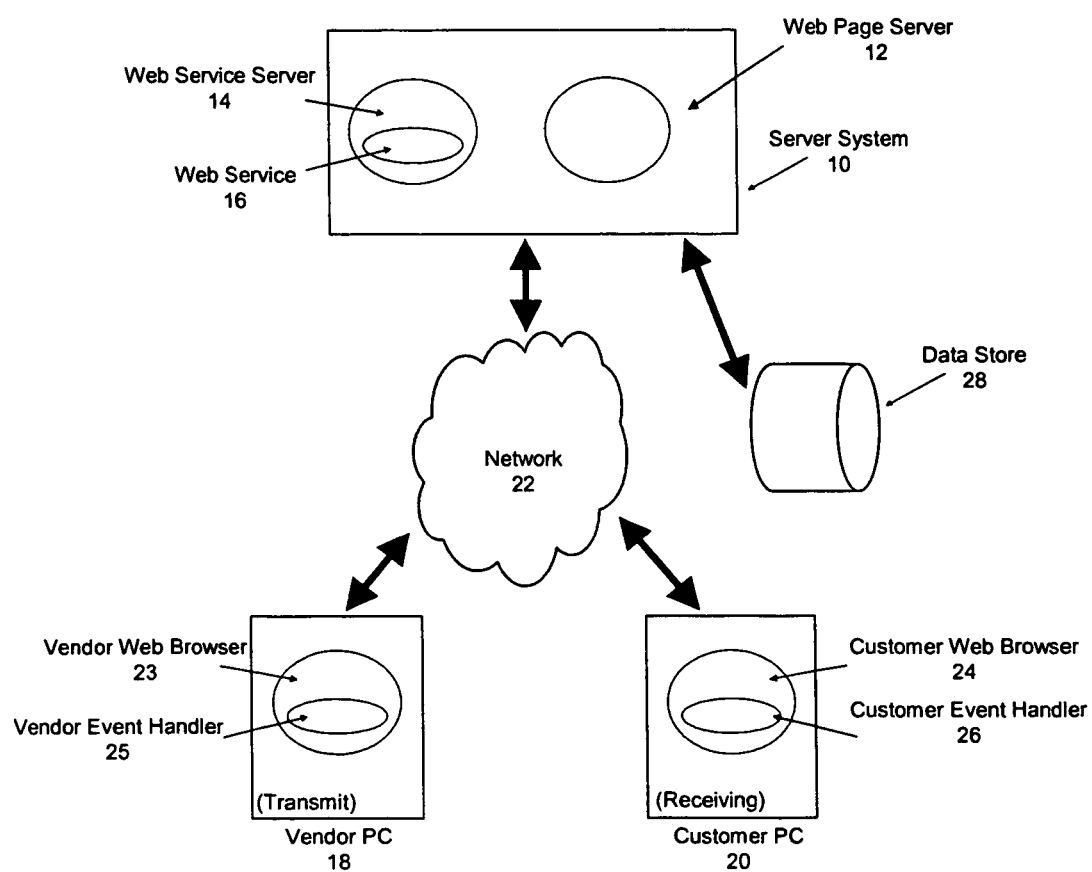
FIG. 1 is a block diagram of a computer network to implement a preferred embodiment of the present invention.

With reference to FIG. 1, the major components of a preferred embodiment of the present invention may be described. Server system 10 is a computer hardware server system as may be implemented in a myriad of forms. Server system 10 may consist of one computer or many such computers, depending upon the expected usage of server system 10 and the other hosting requirements of server system 10. Server computer platforms are available from many vendors, including Dell Computer of Austin, Tex. Server system 10 includes hardware to run at least two services, namely, web page server 12 and web service server 14. Web service server 14 in turn hosts a web service 16. Configurable software to provide this service, as well as software to perform other operating system and application tasks on server system 10, is widely available from such vendors as Microsoft Corporation of Redmond, Wash. Web service 16 is in communication with data store 28 in order to store and retrieve information exchanged between web service 16 and other services as herein described. Data store 28 may be a magnetic disk hard drive such as commonly associated with server hardware, or may be implemented using any other type of digital data storage system.

In communication with server system 10 are vendor personal computer (PC) 18 and customer PC 20. Vendor PC 18 may, for example, be operated by a customer service representative at a call center, and customer PC 20 may be operated by a customer who is accessing the corresponding company's e-commerce web site. Vendor PC 18 and customer PC 20 communicate with server system 10 via network 22. In the preferred embodiment, network 22 is the Internet, but alternative embodiments of the invention may utilize other sorts of internal or external networks 22. Vendor PC 18 runs vendor web browser 23, and customer PC 20 runs customer web browser 24. In the preferred embodiment, software for web browsers 23 and 24 may be Microsoft Explorer from Microsoft Corporation. Web browsers 23 and 24 include functionality to provide vendor event handler 25 and customer event handler 26 at vendor PC 18 and customer PC 20, respectively. The function of event handlers 25 and 26 with respect to the preferred embodiment will be described below.

Figure 2:
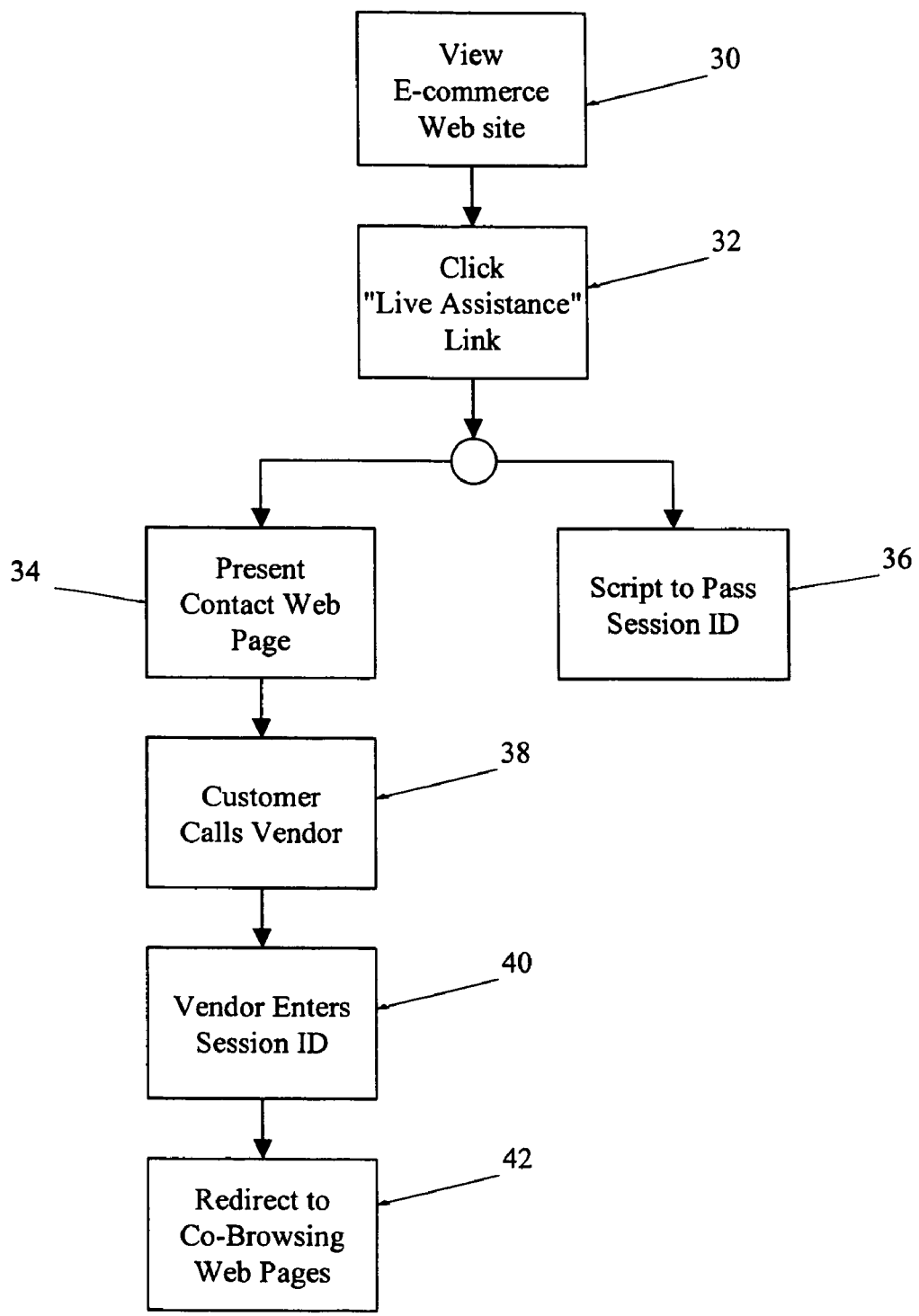
FIG. 2 is a flow chart illustrating the steps in the initialization process of a co-browsing session according to a preferred embodiment of the present invention.
Figure 3:
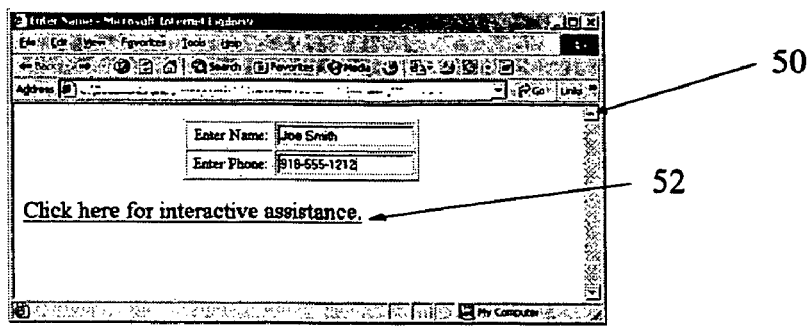
FIG. 3 is an illustration of a customer data entry web page according to a preferred embodiment of the present invention.
Figure 4:
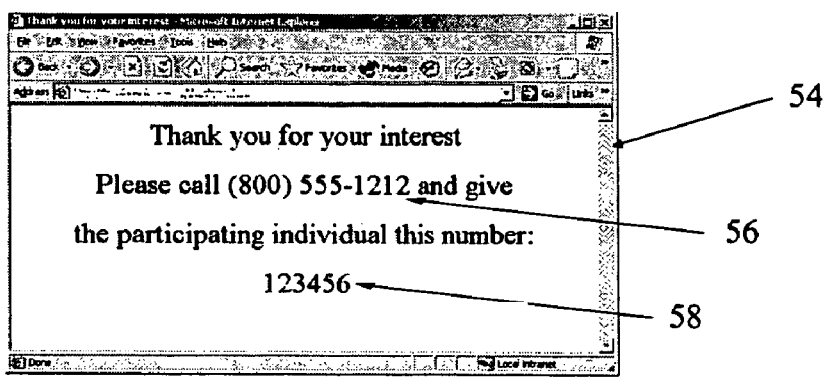
FIG. 4 is an illustration of a customer contact web page according to a preferred embodiment of the present invention.

Referring now to FIG. 2, a description of a preferred method of operation for initiating a co-browsing session according to a preferred embodiment of the present invention may be described. One may suppose that a customer is viewing information at an insurance enrollment web site, an e-commerce web site, or the like, at flow chart block 30. Referring again to FIG. 1, the customer may be utilizing customer PC 20 and is accessing the web over network 22 using customer web browser 24. The web site is maintained at web page server 12 on server system 10. Suppose now that the customer is either reviewing information at the web site, or is entering information called for through a form at the web site, and becomes unsure of how to proceed. Alternatively, the customer may be unfamiliar with web browsing, and may need guidance of a more general nature in order to successfully navigate the web site or provide information requested at the web site. Such problems are particularly likely when the information that a customer is called for to enter is quite complex, such as the case when a customer is completing an insurance application or other information-intensive activity using the web site. In this situation, the customer may at block 32 click a link or button appearing on the web site in order to ask for live or interactive assistance. The screen where such a choice may be made is shown in the preferred embodiment as data entry web page 50 in FIG. 3, which includes assistance link 52. A customer may begin the process of requesting live assistance by placing the web browser cursor on link 52 and clicking on link 52. In response to clicking on link 52, the user is transferred through the action of customer web browser 24 to contact web page 54, as shown in FIG. 4. This is reflected in block 34 in FIG. 3. Contact web page 54 displays telephone number 56, which the customer can use to call for live assistance, as well as a session ID 58.

Session ID 58 is preferably a randomly generated number, but can be any sort of alphanumeric string or other descriptor or symbol that is capable of identifying the particular session or instantiation of the web site being viewed by the customer. Session ID 58 may preferably be generated and stored as a session variable; an example of pseudo-code to perform this function would be:

```
Session("SessionID")=Int(9000 * Rnd( ) + 1000)
'// generate and store random number
txtSession.Text = Cint(Session("SessionID"))
'// Display random number
```

Contact web page 54 also preferably includes text that instructs the customer viewing web page 54 to use telephone number 56 to contact a customer assistance representative, and provide the customer assistance representative with the session ID 58 indicated on web page 54.

At the same time that the customer is presented with web page 54, the customer's web browser running on customer PC 20 runs a code script similar to the following pseudo-code, which calls web service 16 and passes to web service 16 the customer's desire for assistance, along with the user's unique session ID 58. This step is shown in FIG. 2 at block 36. The script of block 36 preferably follows the general form:

```
function init( )
{
    // Initialize web service
    Ready.useService("http://wsl.asmx?wsdl","SharingService");
    // Notify web service that individual 1 is ready
    Ready.SharingService.callService("Individual1",
    "<%=Session("SessionID")%>");
    TestResults( );
}
```

Scripts of this form may preferably be applets written in the Java programming language, developed by Sun Microsystems of Palo Alto, Calif.

Figure 5:
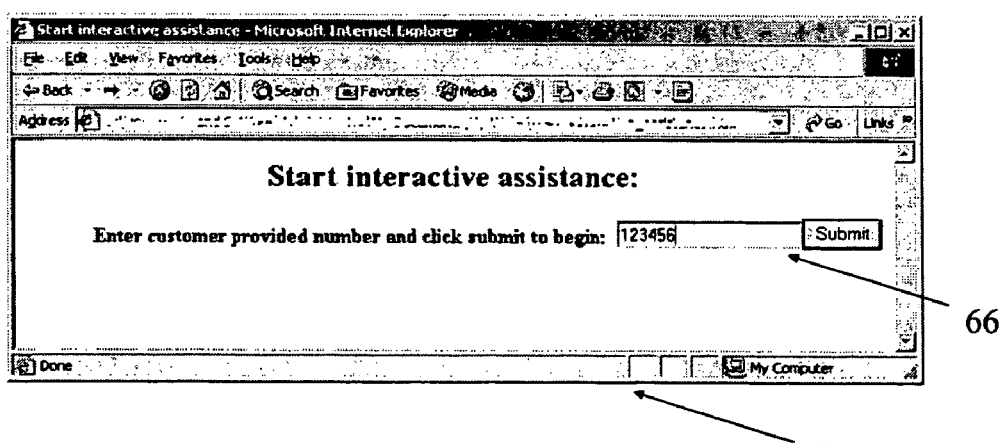
FIG. 5 is an illustration of a vendor entry web page according to a preferred embodiment of the present invention.

After launching such a request for an information sharing session, the participating customer would then telephone the vendor at the provided telephone number 56. The customer would be asked at that time to provide to the customer service representative, who is stationed at vendor PC 18 and is operating vendor web browser 23, to pass along the value of session ID 58 that the customer was previously shown at contact web page 54. Using this information, the customer service representative would then call up entry web page 64 at vendor PC 18; entry web page 64 is shown in the preferred embodiment in FIG. 5. Entry web page 64 preferably contains a session ID entry box 66 or other means for entry of the unique session ID 58. Like web page 54, web page 64 contains an embedded script designed to pass information to web service 16 over network 22. That script could follow the general pseudo-code form:

```
function init( )
{       // make an initialization call to the web service
        Looking.useService("http://ws1.asmx?wsdl","SharingService");
        iSetTimeout = window.setTimeout(TestResults,2000);
}
function TestResults( )
{
        // Call webservice and check for a Session ID
        iCallID = Looking.SharingService.callService(PollInitiator,
"PollInitiator")
        iSetTimeout = window.setTimeout(TestResults,2000);
}
```

Figure 6:
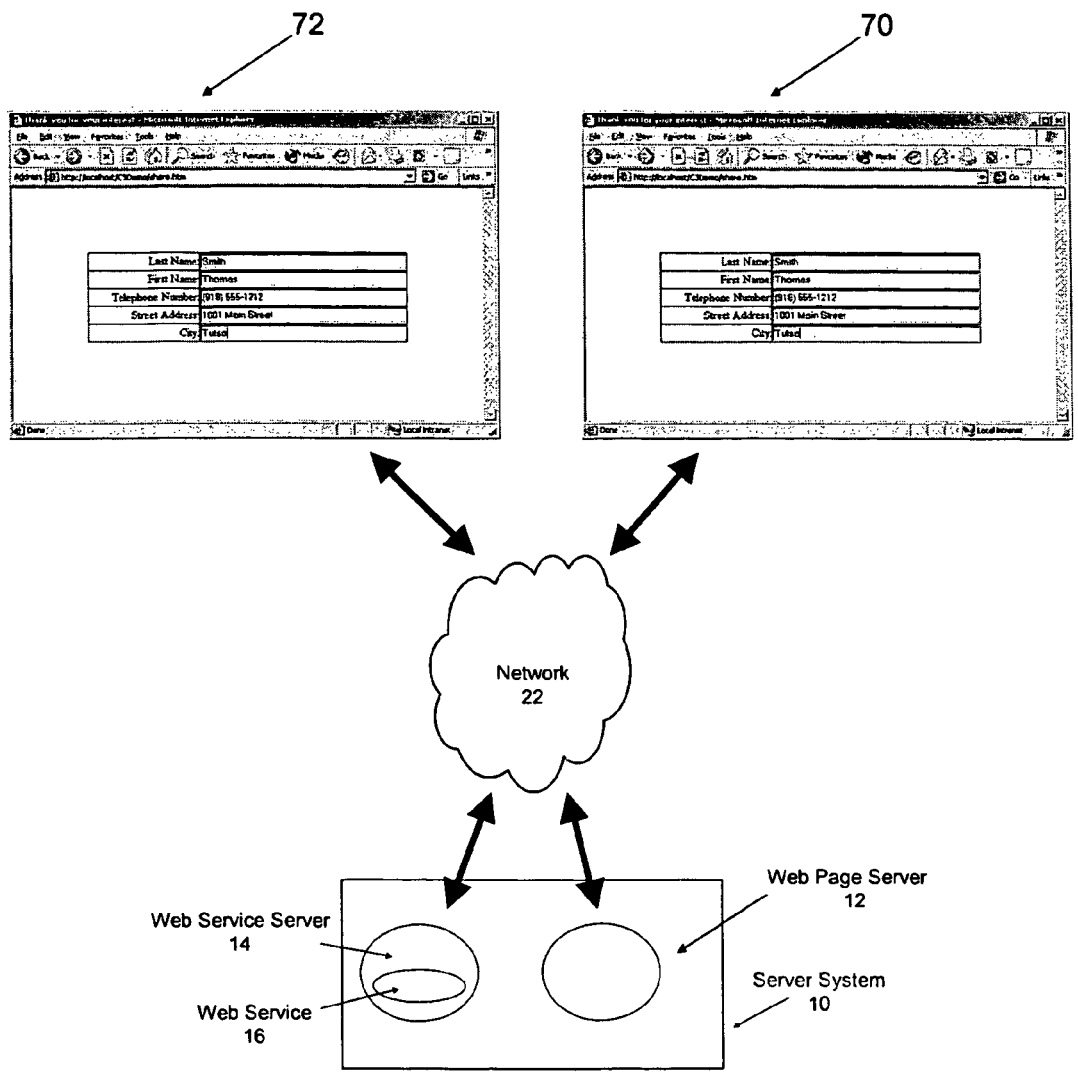
FIG. 6 is a diagram illustrating the interchange of data in order to maintain a co-browsing session according to a preferred embodiment of the present invention.

Once the customer service representative enters session ID 58 in session ID entry box 66, the information sharing process begin. Both customer web browser 23 and vendor web browser 24, running on customer PC 20 and vendor PC 18, respectively, are redirected to customer shared web page 70, and vendor shared web page 72, respectively. These web pages are illustrated in FIG. 6, and this redirect step is illustrated at block 42 in FIG. 2.

The customer shared web page 70 contains software that polls web service 16 at web service server 14 across network 22 for control names and values. Whenever web service 16 returns a control name and value, customer web browser 24 updates customer shared web page 70 with the information received. Such software may, in the preferred embodiment, adopt the following general pseudo-code form:

```
function init( )
{
    // Initialize the web service
    Client.useService("http://ws1.asmx?wsdl","SharingService");
    rerun( );
}
function rerun( )
{
    //Clear Polling Timeout
    window.clearTimeout(iSetTimeout);
    // Request Updates
    iCallID    =    Client.SharingService.callService(Changes,
    "GetChanges",
        <%=Session("SessionID")%>);
}
```

Vendor web browser 23 comprises a poll initiator function that also polls web service 16. This function checks to see whether or not the customer web browser 24 has acknowledged the presence of the vendor web browser 23. If so, the vendor web browser 24 is ready to transmit information to web service 16 using vendor event handler 25. In this way, the customer service representative at vendor PC 18 may make changes or move about on vendor shared web page 72, with such changes being reflected on customer shared web page 70.

Specifically, vendor web browser 23 is in the preferred embodiment configured with "on change" or "on click" tags which, in turn, call a script in vendor event handler 25 that passes those changes to web service 16. A typical "on change" tag call to the SendEvent script could follow this general pseudo-code format:

```
<input type="text" name="txtInputValue" maxlength="10" size ="10"
value="" ID="Text3" onchange="SendEvent(this);">
```

Thus whenever the custom service representative enters information into a text box on vendor shared web page 70 (or any page to which the customer service representative subsequently moves and which is configured for co-browsing), or the customer service representative changes the state of a radio button, or a list box, or any other control, the "on change" event "fires" and triggers a call to the "SendEvent" function of vendor event handler 25. The SendEvent function, in turn, calls web service 16 and passes the control (sFieldName) and its value (sFieldValue) to web service 16. The SendEvent function takes the following pseudo-code form in the preferred embodiment:

```
function SendEvent(element)
{
    var sFieldName = element.name;
    var sFieldValue = element.value;
    iCallID = Looking.SharingService.callService("SendEvent", _
    sFieldName, sFieldValue,<%=Session("SessionID")%>);
}
```

Likewise, the web service 16 SendEvent function stores the controls and values for later retrieval by customer event handler 26 of customer web browser 24. The web service 16 SendEvent method could take the following general pseudo-code form:

```
<WebMethod( )> Public Function SendEvent(ByVal sFieldName as
String, ByVal sFieldValue as String, ByVal sSessionID as
String) as String
    Application(sSessionID) = Application(sSessionID) & "|" & _
    sFieldName & "|" & sFieldValue
    SendEvent="ACK"
End Function
```

The SendEvent method of web service 16 simply appends control names and values sent by vendor event handler 25 to a queue, addressable by the shared Session ID 28, for storage (at data store 28 or other memory or storage facilities) and subsequent retrieval by customer web browser 24. In the example, the queue is saved as an Application Variable but the queue could just as easily be saved as a Session Variable, a database entry, pushed to a processor's stack, or even written to a simple text file should saving and retrieval speed not be essential.

Customer event handler 26 of customer web browser 24 polls the web service for control names and values. Whenever web service 16 returns a control name and value, the polling customer web browser 24 updates the state of those controls within customer web browser 24 with the information received. This functionality of customer event handler 26 may take the following general pseudo-code form in the preferred embodiment:

```
function init( )
{
    // Initialize the web service
    Client.useService("http://ws1.asmx?wsdl","SharingService");
    rerun( );
}
function rerun( )
{
    //Clear Polling Timeout
    window.clearTimeout(iSetTimeout);
    // Request Updates
    iCallID    =    Client.SharingService.callService(Changes,
    "GetChanges",
        <%=Session("SessionID")%>);
}
```

The corresponding code at web service 16 on web server 14 may take the following general pseudo-code form:

```
<WebMethod( )> Public Function GetChanges(ByVal strSessionID As
String) As String
    GetChanges=Application(strSessionID) ' // Return update queue.
    Application(strSessionID)="" '//Clear application variable.
End Function
```

Finally, customer web browser 24 receives and process the GetChanges value using a software function in customer event handler 26 that in the preferred embodiment may be of the following general pseudo-code form:

```
Function GetChanges(Change)
{
    // Check to see if there is a Change
    if (Change.value != "")
    {
        // sets a variable to the Change value
        var stringvalues = Change.value;
        // defines the deliminator of the XML
        var reg3 = /\|/;
        // defines a value which will split the received HTML
        // into two pieces -- the name of the field and the value
        var stringarray = stringvalues.split(reg3);
        // Loop through the number of elements on the page
        // This loop is a dynamic loop getting the total number of
        // elements and if the name of the element matches places
        // the value in the control
        for(array=0; array <= stringarray.length - 1; array++)
        {
            for(count=0; count <= frmMain.elements.length - 1;
            count++)
            {
                //Define variables to hold array information
                var strArrayValue = stringarray[array]
                var strArray2Value = stringarray[array + 1]
                if (frmMain.elements[count].name == strArrayValue)
                {
                    var strBlank = null;
                    if (strArray2Value == strBlank)
                    {
                        frmMain.elements[count].value = "";
                        break;
                    }
                    Else
                    {
                        frmMain.elements[count].value =
                        strArray2Value;
                        break;
                    }
                }
            }
        }
    }
    // repeat the init call at a specified millisecond interval
    // window.setTimeout(<call>, <ms value>)
    iSetTimeout = window.setTimeout(rerun, interval);
}
```

The present invention is responsible for queuing change events passed by the participating web browsers via calls by web service 16 to data store 28. Web service 16 also retrieves change events from data store 28 and passes them to the requesting web browser via calls to web service 16. This process allows information to flow from sending browser 23 or 24, to web service 16, to receiving browser 23 or 24 without any direct or continuous connection between the two browsers. Since each browser is communicating only with web service 16, the firewall and proxy server issues involved with previous remote information sharing and assistance are eliminated.

The technique of sending only change events and values via those web service 16 calls serves to dramatically reduce the bandwidth requirements of the present invention over those of the prior art. This technique avoids the need to refresh entire pages between views and provides a means of maintaining synchronization of viewing experiences with a high degree of reliability. The technique of queuing change events as a data store at data store 28 maintained by web service server 14 is also advantageous. This technique provides the rapid storage and recovery of data required to support interactive assistance sessions.

The present invention has been described with reference to certain preferred and alternative embodiments that are intended to be exemplary only and not limiting to the full scope of the present invention.

What is claimed is:

1. A co-browsing system, comprising:
   (a) a network comprising an interconnected web server computer, vendor computer, and customer computer;
   (b) a standard web site hosted at said web server, accessible by said customer computer, and comprising a plurality of standard web pages;
   (c) a customer co-browsing web site hosted at said web server, accessible by said customer computer, and comprising a plurality of customer co-browsing web pages, wherein each of said customer co-browsing web pages is identical in appearance from a customer's point of view to one of said standard web pages, and said customer co-browsing web site further comprises a polling routine operable to repeatedly initiate a polling request to said vendor computer for change events transmitted from said vendor computer while both said customer co-browsing web site is accessed at said customer computer and the standard web site is being accessed;
   (d) a vendor co-browsing web site hosted at said web server, accessible by said vendor computer, and comprising a plurality of vendor co-browsing web pages, wherein at least one of said vendor co-browsing web pages corresponds to one of said customer co-browsing web pages, and wherein said vendor co-browsing web site comprises an event handler operable to collect and transmit vendor co-browsing web site change events received from said vendor computer to said customer computer in order to synchronize a currently accessed vendor co-browsing web page with a currently accessed customer co-browsing web page, wherein said vendor co-browsing web site change events each comprise a change event identifier that identifies a control on said vendor co-browsing web page that has changed, and a change event value that identifies the new value of the control on said vendor co-browsing web page that has changed; and
   (e) a data store in communication with said vendor co-browsing web site, wherein said data store is operable to store said vendor co-browsing web site change events.

2. A method for initiating a co-browsing session utilizing a web server computer, a vendor computer, and a customer computer, comprising the steps of:
   (a) providing a data entry web page from the web server computer to a first web browser executing on the customer computer while said first web browser is navigating a first web site;
   (b) receiving an activation event at the web server from the first web browser;
   (c) providing a contact web page from the web server to the first web browser, wherein the contact web page comprises a session identifier;
   (d) receiving at a second web browser executing on the vendor computer the session identifier and launching at said second web browser a second web site;
   (e) transmitting the session identifier to the web server; and
   (f) providing a web page from a third web site from the web server to the first web browser, and a web page from the second web site from the web server to the second web browser, where the web pages from the first and third web pages are identical in appearance to an operator of the first web browser, and wherein the second web site comprises an event handler operable to transmit a change event, and the third web site comprises a polling routine operable to repeatedly initiate a polling request for change events at the second web browser while the second and third web sites are both simultaneously being accessed in order to synchronize a currently accessed web page at the second web site with a currently accessed web page at the third web site.

3. The method of claim 2, wherein the data entry web page comprises a request assistance link, and the activation event is associated with the request assistance link.

4. The method of claim 3, wherein the contact web page comprises contact information.

5. The method of claim 4, wherein the contact information comprises a telephone number.

6. The method of claim 5, further comprising the step of providing a session identifier entry web page from the web server to the second web browser.

7. A co-browsing method utilizing a web server computer, a vendor computer, and a customer computer, comprising the steps of:
  (a) from the web server computer, transferring a first contact web page of a first web site to a first web browser operating on the customer computer;
  (b) displaying at a second web browser operating on the vendor computer a session ID entry page of a second web site;
  (c) receiving a session ID at the session ID entry page;
  (d) redirecting the first web browser from the first web site to a third web site, wherein each of the first and third web sites comprise at least one web page that are identical in appearance to each other;
  (e) receiving at the second web browser a change event representing a change to at least one control visible in the second web site, wherein the change event comprises a change event identifier that identifies the control that has changed, and a change event value that identifies the value of the change that has occurred to the control;
  (f) transmitting the change event from the second web browser to the web server computer;
  (g) repeatedly initiating a polling request from the third web site to the web server computer for a change event at the second web browser while the first and third web sites are both being accessed;
  (h) transmitting the change event from the web server computer to the third web site in response to the polling request in order to synchronize a currently accessed web page at the second web site with a currently accessed web page at the third web site; and
  (i) storing said change event in a data store in communication with the web server computer.

8. A co-browsing system, comprising:
  (a) a computer network;
  (b) a vendor computer connected to said network and comprising an Internet browser;
  (c) a customer computer connected to said network by means of at least one standard Internet port and comprising a standard Internet browser;
  (d) a web server computer connected to said network, wherein said web server computer comprises:
    (i) a standard web site accessible by said customer computer Internet browser and comprising a plurality of standard web pages;
    (ii) a customer co-browsing web site accessible by said customer computer Internet browser and comprising a plurality of customer co-browsing web pages, wherein each of said customer co-browsing web pages is identical in appearance to one of said standard web pages, and said customer co-browsing web site further comprises a polling routine operable to repeatedly initiate a polling request to said vendor co-browsing web site for change events at the vendor computer Internet browser while said customer co-browsing web site and said standard web site are both being accessed; and
    (iii) a vendor co-browsing web site accessible by said vendor computer Internet browser and comprising a plurality of vendor co-browsing web pages, wherein each of said vendor co-browsing web pages corresponds to one of said customer co-browsing web pages, and wherein said vendor co-browsing web site comprises an event handler operable to collect vendor co-browsing web site change events received through said vendor computer Internet browser and transmit vendor co-browsing web site change events to said web server in order to synchronize a currently accessed vendor co-browsing web page with a currently accessed customer co-browsing web page, wherein said vendor co-browsing web site change events each comprise a change event identifier that identifies a control on said vendor co-browsing web site that has changed, and a change event value that identifies the new value of the control on said vendor co-browsing web site that has changed; and
  (e) a data store in communication with said web server computer, wherein said data store is operable to store said vendor co-browsing web site change events,
  wherein said vendor computer and said customer computer are operable to communicate with each other only by means of said web page server over said network through said standard Internet port of said customer computer.

\* \* \* \* \*